United States Patent
Hamada et al.

(10) Patent No.: US 8,770,153 B2
(45) Date of Patent: Jul. 8, 2014

(54) WATER HEATER

(75) Inventors: Tetsurou Hamada, Hyogo (JP); Yoshinori Kanda, Hyogo (JP); Hideaki Yoshitomi, Hyogo (JP)

(73) Assignee: Noritz Corporation, Hyogo (JP)

( * ) Notice: Subject to any disclaimer, the term of this patent is extended or adjusted under 35 U.S.C. 154(b) by 1387 days.

(21) Appl. No.: 11/585,949

(22) Filed: Oct. 25, 2006

(65) Prior Publication Data

US 2007/0099134 A1 May 3, 2007

(30) Foreign Application Priority Data

Nov. 2, 2005 (JP) .................................. 2005-320202

(51) Int. Cl.
| | |
|---|---|
| *B01B 1/00* | (2006.01) |
| *F24D 3/00* | (2006.01) |
| *F24D 3/02* | (2006.01) |
| *F24H 8/00* | (2006.01) |

(52) U.S. Cl.
USPC ............. 122/15.1; 122/18.1; 122/33; 237/56; 237/57; 237/62

(58) Field of Classification Search
CPC ............... B01B 1/00; F24D 3/00; F24D 3/02; F24H 8/00
USPC ............ 122/31.1, 33, 15, 1, 18.1; 237/56, 57, 237/62
IPC .......... B01B 1/00; F24D 3/00, 3/02; F24H 8/00
See application file for complete search history.

(56) References Cited

U.S. PATENT DOCUMENTS

| | | | | | |
|---|---|---|---|---|---|
| 1,232,567 | A | * | 7/1917 | Kreiter ........................... | 165/177 |
| 1,342,073 | A | * | 6/1920 | Trinks ........................... | 432/179 |
| 4,502,626 | A | * | 3/1985 | Gerstmann et al. ........... | 122/44.2 |
| 5,822,854 | A | * | 10/1998 | Ikejima et al. ............ | 29/890.047 |
| 6,401,669 | B1 | * | 6/2002 | Macgowan et al. ......... | 122/448.1 |
| 6,694,927 | B1 | * | 2/2004 | Pouchak et al. ............ | 122/448.1 |
| 6,866,202 | B2 | * | 3/2005 | Sigafus et al. ................. | 236/11 |
| 7,281,497 | B2 | * | 10/2007 | Le Mer et al. ............... | 122/31.2 |
| 7,523,721 | B2 | * | 4/2009 | Hamada et al. .............. | 122/31.1 |
| 7,591,433 | B2 | * | 9/2009 | Wang et al. .................. | 236/49.3 |
| 2007/0235550 | A1 | * | 10/2007 | Donath et al. ................. | 237/1 R |

FOREIGN PATENT DOCUMENTS

| | | | | |
|---|---|---|---|---|
| EP | 459785 | A1 * | 12/1991 | ............... F24H 1/40 |
| EP | 1544555 | A2 * | 6/2005 | ............... F24H 8/00 |
| EP | 2072931 | A2 * | 6/2009 | ............... F24H 8/00 |
| EP | 2116777 | A2 * | 11/2009 | ............... F24H 8/00 |
| EP | 2128538 | A2 * | 12/2009 | ............... F24H 8/00 |
| JP | 2004-044912 | A | 2/2004 | |

* cited by examiner

*Primary Examiner* — Kang Hu
*Assistant Examiner* — Daniel E Namay
(74) *Attorney, Agent, or Firm* — Rader, Fishman & Grauer PLLC

(57) ABSTRACT

A first period during which drain is not substantially generated on a surface of a water tube (4) of a heat exchanger (B1), and a second period as a transition during which an amount of drain on the surface of the water tube (4) is increased are provided. There are a plurality of kinds of fan-controlling data in which operation control contents of the fan (13) in the first and second periods in correspondence with change of conditions of entering water temperature or combustion level of the burner (1). The fan-controlling data are stored in a data table (90) of a controller (9). The controller (9) controls the fan (13) in accordance with the data, and an initial air-fuel ratio of combustion driving of the burner (1) is stabilized.

12 Claims, 16 Drawing Sheets

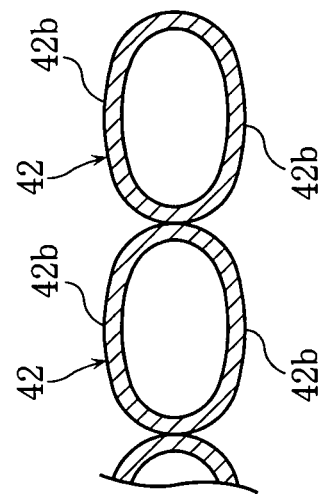
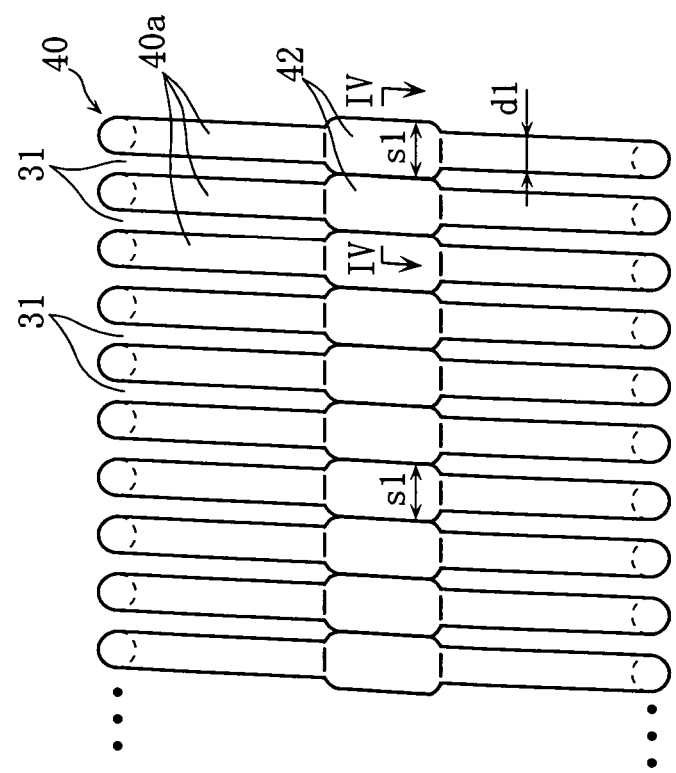
FIG. 4B
FIG. 4A

F I G. 6
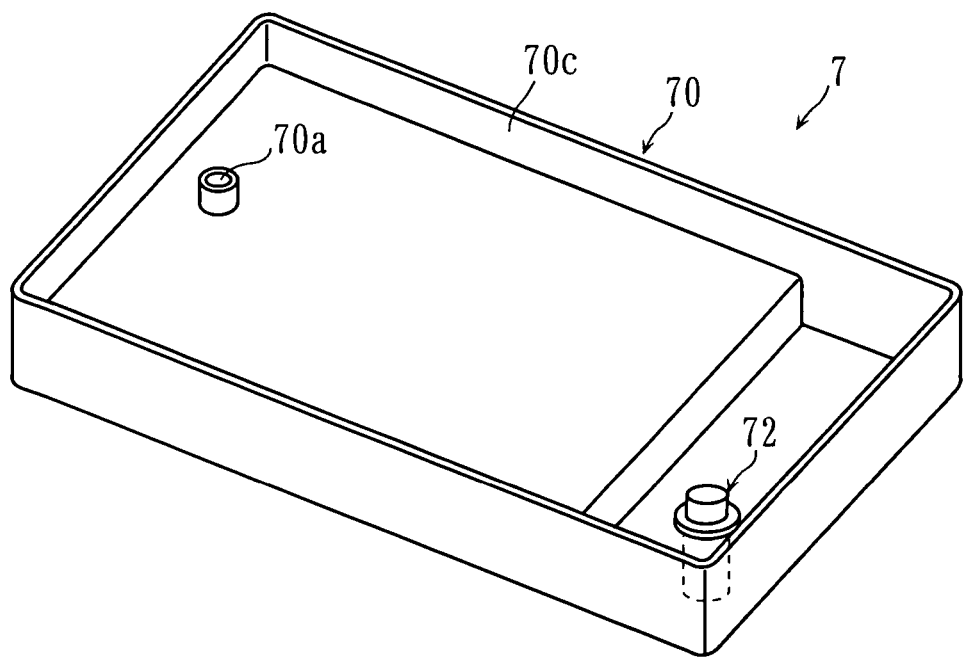

F I G. 1 5
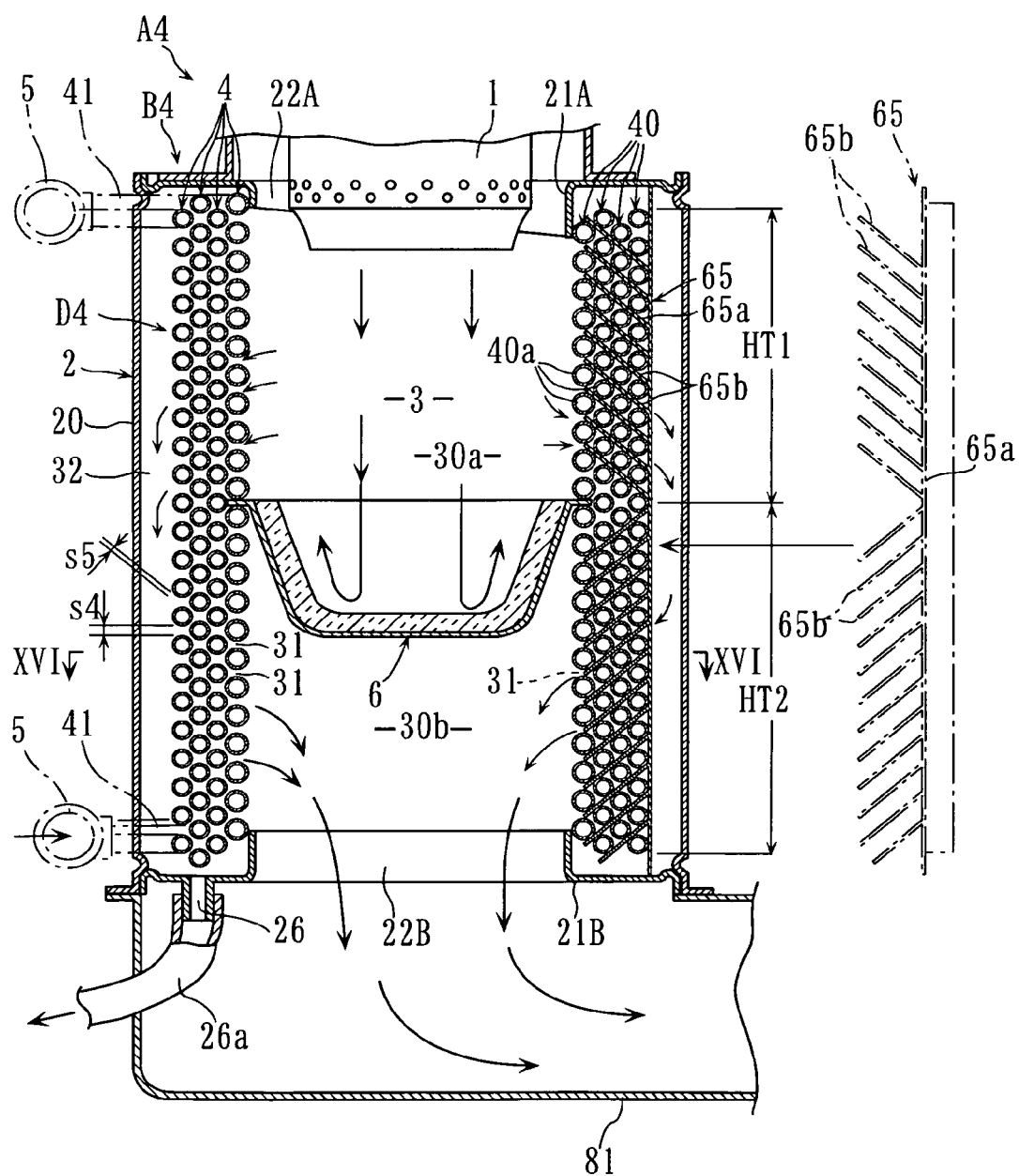

WATER HEATER

BACKGROUND OF THE INVENTION

1. Field of the Invention

The present invention relates to a water heater and, more particular, to a water heater for producing hot water with recovering heat from combustion gas generated by a burner.

2. Description of the Related Art

The present assignee proposes one example of a water heater in Japanese Patent Application Laid-open No. 2004-44912. This water heater is suitable for recovering sensible heat and latent heat from combustion gas generated by a burner by using a heat exchanger including water tubes. When latent heat is recovered from combustion gas, condensate (that is, condensation water in condensing vapor) is generated on a surface of the water tubes by condensing vapor in the combustion gas. This condensate causes a gas-flow blocking in the heat exchanger. The blocking of gas-flow decreases the amount of airflow to the burner and it is difficult to burn fuel appropriately at predetermined air-fuel ratio. Therefore, a controller associated with the present water heater decides whether the blocking of gas-flow occurred or not. This decision process checks and decides the blocking of gas-flow in the following cases; for example, when the amount of airflow decreases lower than a predetermined amount of airflow and this state continues more than predetermined period, or when the temperature of the heat exchanger decreases lower than a predetermined temperature and this state continues more than predetermined period.

In this water heater, the amount of airflow generated by a fan is controlled to increase when the blocking of gas-flow occurs. Therefore, the air-fuel ratio is preserved at predetermined value. The pressure of the airflow blows the condensate off from the surface of the water tubes, which solves the problem of the gas-flow blocking.

In the conventional art, however, there are the following problems to preserve the air-fuel ratio at the predetermined value.

That is, there is a process to accumulate condensate gradually on the surface of the tubes after starting to drive the burner. The gas-flow blocking is occurring in this step, but the gas-flow area in the heat exchanger is decreasing gradually.

In the conventional water heater, the amount of airflow generated by the fan does not increase when gas-flow blocking does not occur. Therefore, the fan does not supply a sufficient amount of airflow in the initial operating step of combustion and condensate gradually generates and accumulates. This shortage of airflow is relatively small.

To solve the above problem it is required to adjust the burner under the conditions as appropriate as possible.

DISCLOSURE OF THE INVENTION

An object of the present invention is to provide a water heater to solve or appropriately mitigate the above-described problems.

The present invention employs the following technical means to solve the above-described problems.

The present invention provides a water heater comprising a burner, a fan for supplying air for combustion, a heat exchanger including a housing into which combustion gas is supplied together with air, and a water tube recovering sensible heat and latent heat from the combustion gas, and at least a portion of the water tube which is disposed in the housing, and a controller including a data table for controlling the fan based on the data stored in the data table, wherein a plurality of fan-controlling data is stored in the data table, as a plurality of the fan-controlling data, there are a first period during which condensate does not substantially generate on a surface of the water tube and a second period during which condensate generates increasing gradually as transition period on the surface of the water tube, the rotational speed of the fan is defined as a predetermined initial rotational speed within the first period, the rotational speed of the fan is defined as the rotational speed increases corresponding to a time elapsing within the second period, and the plurality of fan-controlling data are defined in correspondence with at least one of a combustion level by the burner and a temperature of the water entering the heat exchanger.

Preferably, a third period during which the generation of condensate is stabilized is provided in each of the fan-controlling data, and the third period includes data for stopping the increase of the rotational speed of fan when the third period starts after completing the second period.

Preferably, the controller determines a condensate remaining state in restarting the burner based on first data, second data, and third data, wherein the first data concerns the amount of remaining condensate when the last combustion by the burner is completed, the second data concerns the elapsed time till restarting combustion after completing the last combustion, the third data concerns the temperature of the housing during the elapsed time, and the initial rotation is changed in accordance with a result of the determination such that the initial rotation is higher as generated condensate is more.

Preferably, under the condition that time elapsed till restart of combustion after completing the last combustion exceeds a predetermined period in restarting the burner, the controller apply a predetermined rotational speed as the initial speed of the fan despite of the contents of the first and the third data.

Preferably, the controller checks the remaining condensate state based on the first data, the second data, and the third data, wherein the first data concerns the amount of remaining condensate in completing the last combustion by the burner, the second date concerns the elapsed time till restarting combustion after completing the last combustion by the burner, and the third data concerns temperature during the elapsed time, and under the condition that the controller decides that the amount of remained condensate is equal to and more than a predetermined value, the controller delays the burner driving for predetermined time and rotates the fan at predetermined speed to reduce the remained condensate during this delay time.

Preferably, the controller checks the amount of remaining condensate in completing combustion by the burner, and under the condition that the controller decides that the amount of remaining condensate is equal to and more than a predetermined value, the controller continues rotating the fan to reduce the remaining condensate thereafter.

Preferably, the housing of the heat exchanger includes a circumferential wall with a first and a second opening at axially opposite ends, the water tubes includes a plurality of loops along the axial direction Via clearances, and a combustion path is formed around the coiled tube and inside the circumferential wall for guiding combustion gas in the housing, a partition is provided in a inner space in the coiled tube and the partition divides the space in the axial direction into a first and a second heat-exchanging portions surrounding the first and a second region, respectively, and wherein combustion gas supplied to the first region flows to the combustion gas path by flow through a clearance of the first heat-exchanging portion and then flows through a clearance of the second heat-exchanging portion.

Preferably, the heat exchanger drops down sideways, and a plurality of loops is arranged substantially in the horizontal direction via a clearance along the axial direction of the coiled loops.

Preferably, the heat exchanger is inclined on the slant, and a plurality of loops is arranged on the slant direction with respect to the horizontal direction via a clearance along the axial direction of the coiled loops.

Preferably, at least one additional coiled tube is provided and this additional coil includes a plurality of loops arranged in housing along the axial direction via a clearance, and the additional coil surrounds outsides of said coiled tube in a tube overlapping-winding structure, the tube overlapping-winding structure is divided into a first heat-exchanging portion for recovering sensible heat surrounding the first and second region and a second heat-exchanging portion for recovering latent heat, combustion gas supplied to the first region flows through the clearance of the first heat-exchanging portion and flows the combustion gas passage, the combustion gas flows through the clearance of the second heat-exchanging portion, the loops of at least the second heat-exchanging portion of the tube overlapping-winding structure which are adjacent to each other in a direction intersecting with the axial direction are arranged on a straight line inclined with respect to the axial direction, and the clearance of the second heat-exchanging portion is inclined such that height of the clearance is reduced as moving in the advancing direction of the combustion gas.

Preferably, a minimum width of the clearance of the second heat-exchanging portion in a direction intersecting with an extending direction of the clearance at right angles is smaller than a minimum width of the clearance of the second heat-exchanging portion in the axial direction.

Preferably, water-repellent portions are partially provided on outer surfaces of loops of the second heat-exchanging portion.

Preferably, hydrophilic portions are partially provided on locations of outer surfaces of loops of the second heat-exchanging portion.

These and other features and advantages of the invention will become clear by the following description of preferred embodiments of the invention with reference to the accompanying drawings.

BRIEF DESCRIPTION OF THE DRAWINGS

FIG. 4A is an explanatory view of a coiled tube of the water heater shown in FIG. 1.

FIG. 4B is a sectional view taken along lines IV-IV in FIG. 4A.

FIG. 6 is a perspective view of an outward appearance of a neutralization apparatus used for the water heater shown in FIG. 1.

FIG. 15 is a sectional view of a principal of the water heater shown in FIG. 14.

BEST MODE FOR CARRYING OUT THE INVENTION

Preferred embodiments of the present invention will be described below in detail with reference to the accompanying drawings.

FIGS. 1 to 6 show an example of the water heater and a structure related to the water heater according to the present invention.

Figure 1:
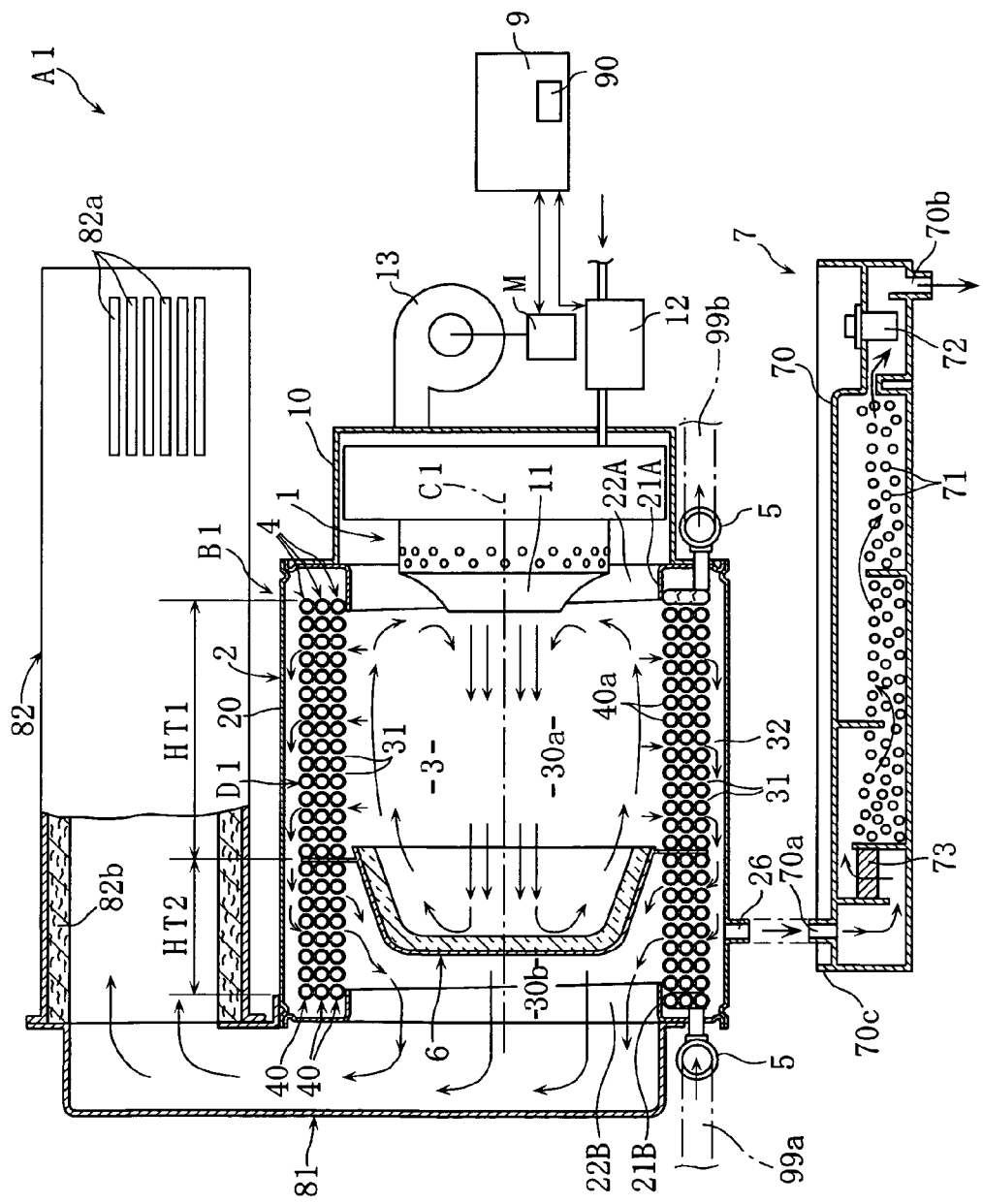
FIG. 1 is a schematic sectional view showing an example of a water heater according to the present invention.
Figure 2:
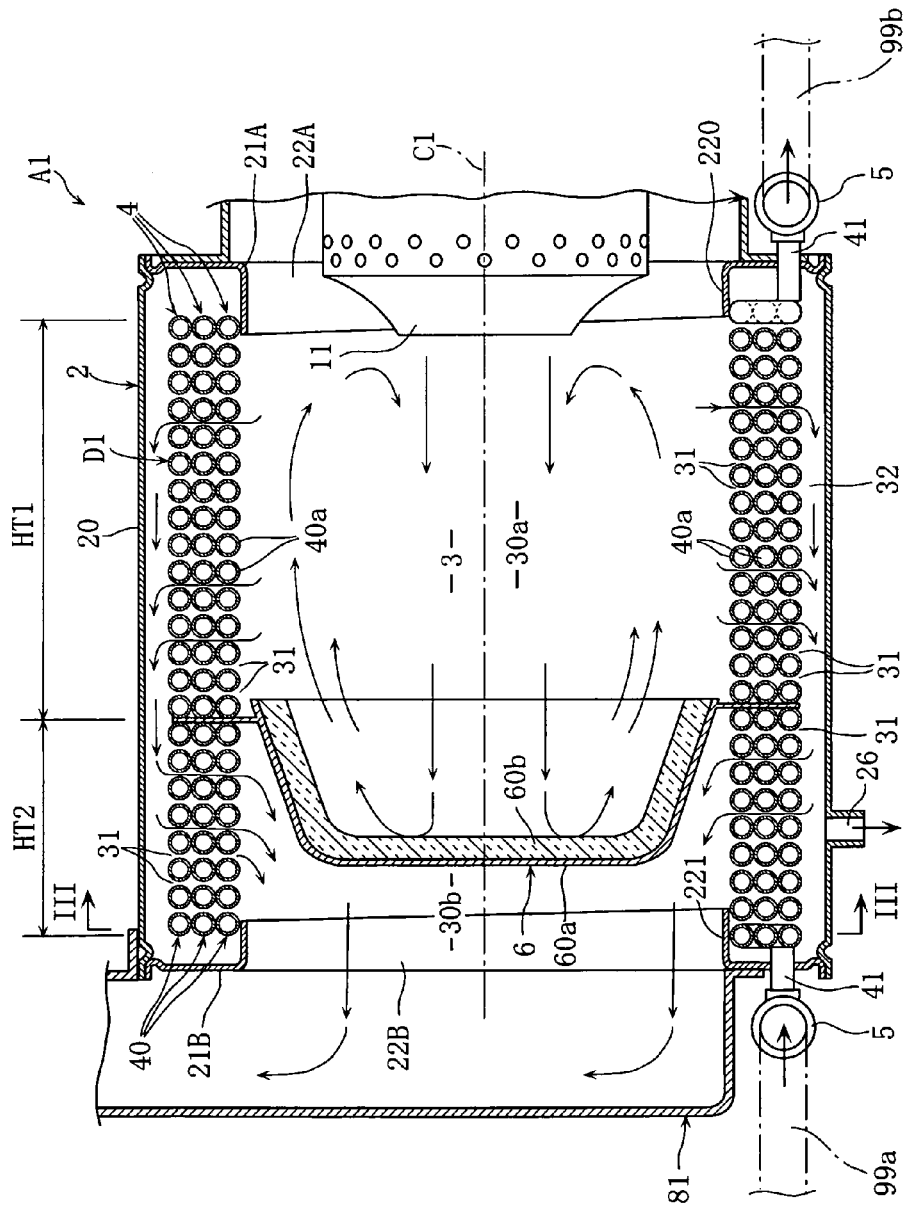
FIG. 2 is a sectional view of a principal portion of the water heater shown in FIG. 1.

As well shown in FIG. 1, a water heater A1 of the embodiment includes a burner 1, a heat exchanger B1, exhaust ducts 81 and 82, a controller 9 and a neutralization apparatus 7.

The burner 1 burns fuel oil such as kerosene and light oil. The burner 1 injects fuel oil supplied from a fuel tank (not shown) at an injection nozzle (not shown) through a fuel supply controller 12, and the fuel oil injected is mixed with air and is burned. Combustion gas generated by the burner 1 is injected from a nozzle portion 11 into the heat exchanger B1 substantially in the horizontal direction. The fuel supply controller 12 includes a solenoid valve to adjust fuel to the burner 1. The fuel supply controller 12 adjusts to cut off fuel supplied and controls a fuel amount supplied. The controller 9 drives the solenoid valve. The fan 13 sends outside air into a casing 10 covering the burner 1. The controller 9 also controls the drive of a motor M in the fan 13. The detail of control is described thereafter.

The heat exchanger B1 includes a housing 2, a plurality of water tubes 4, a pair of headers 5, and a partition member 6. The entire heat exchanger B1 is laterally inclined such that a center axis C1 of a housing 2 is inclined substantially horizontally. The housing 2 includes a substantially cylindrical circumferential wall 20, and a pair of cover bodies 21A and 21B mounted on both ends of the circumferential wall 20 in its axial direction. As shown clearly in FIG. 2, the cover body 21A is formed with an opening 22A to enter the nozzle portion 11 of the burner 1. The cover body 21B is formed with an opening 22B through which combustion gas utilized for recovering heat is introduced into the exhaust duct 81. Condensate generated by recovering latent heat from the combustion gas has strong acidity of about PH3 after absorbing sulfur oxides or nitrogen oxides in the combustion gas. The housing 2 is made of stainless steel having excellent resistance to acids so that the housing 2 does not rust easily due to the condensate. The water tubes 4 are also made of stainless steel for the same reason.

The number of the water tubes 4 is, for example, three. The water tubes 4, respectively, include a coiled tube 40 disposed in the housing 2. The coiled tubes 40 are helical tubes around the center axis C1. Hollow circular spirally looped portions 40a are laminated in a plurality of stages in the horizontal direction. Winding diameters of the coiled tubes 40, respectively, are different from each other, and constitute a tube overlapping-winding structure D1 in which the coiled tubes are substantially concentrically wound.

A plurality of short tubes 41 passing through the cover bodies 21A and 21B are connected to both ends of the coiled tubes 40. The pair of headers 5 is connected to the short tubes 41. A water supply pipe 99a for being supplied service water is connected to the header 5 near the exhaust ducts 81 and 82. Water supplied from the water supply pipe 99a to the header 5 branches into the coiled tubes 40, and the water is heated to produce hot water on the flowing process through the coiled tubes 40.

On the other hand, a hot water outlet tube 99b is connected to the header 5 near the burner 1. Hot water heated by passing through the coiled tube 40 is sent out to a desired hot-water tap through the header 5 and the hot water outlet tube 99b.

A space 3 is formed inside the innermost-coiled tube in coiled tubes 40. The partition member 6 divides the space 3 into a first region 30a and a second region 30b. Based on this, the tube overlapping-winding structure D1 is divided into a first heat-exchanging portion HT1 and a second heat-exchanging portion HT2, which respectively surround the first region 30a and second 30b. The partition member 6 is made of specific materials, which are laminated excellent fire-resistance and heat-resistance on a single side of a stainless base portion 60a. For example, the heat insulator 60b is made of ceramic. A surface opposed to the burner 1 in the partition member 6 is concave and combustion gas generated from the burner 1 is reflected toward the burner 1. A combustion gas passage 32 is defined between the outermost-coiled tube in the coiled tubes 40 and the circumferential wall 20 of the housing 2.

A clearance 31 is formed between loops 40a where a plurality of the coiled tubes are adjacent to each other in the horizontal direction. The first region 30a and the second region 30b are in communication with the combustion gas passage 32 through the clearance 31. Based on this structure, the combustion gas flows into the combustion gas passage 32 through the clearance 31 in the first heat-exchanging portion HT1 from the first region 30a of the space 3. After that, the combustion gas flows into the second region 30b through the clearance 31 of the second heat-exchanging portion HT2 from the combustion gas passage 32.

The cover bodies 21A, 21B have annular walls 220, 221 which form openings 22A, 22B, and the cover bodies 21A, 21B are in contact with the peripheral surface of the innermost-coiled tube 40. Based on this structure, combustion gas does not flow enough between the end-surfaces of both ends of the coiled tubes 40 in its axial direction and the cover bodies 21A, 21B.

Figure 3:
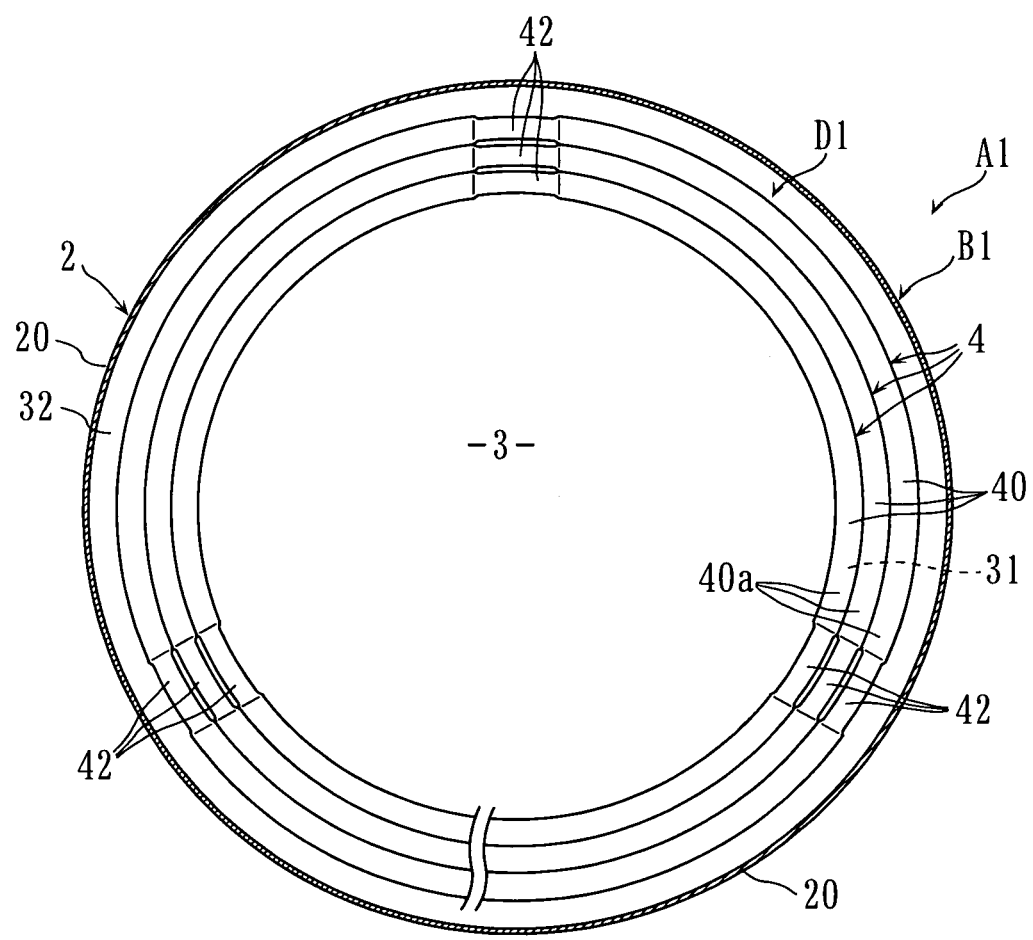
FIG. 3 is a sectional view taken along lines III-III in FIG. 2.

As shown in FIG. 3, each clearance 31 is formed by providing three flat-deformed portions 42 on the loops 40a substantially at equal distances from each other. More specifically, as shown in FIG. 4A, the flat-deformed portion 42, where a width s1 in the axial direction is greater than a tube diameter d1 of other portion, is formed on the loop portion 40a of each coiled tube 40. The deformed portions 42, which are abutment, contact with themselves each other and the loops 40 except the deformed portions 42 are the clearance 31.

Figure 5:
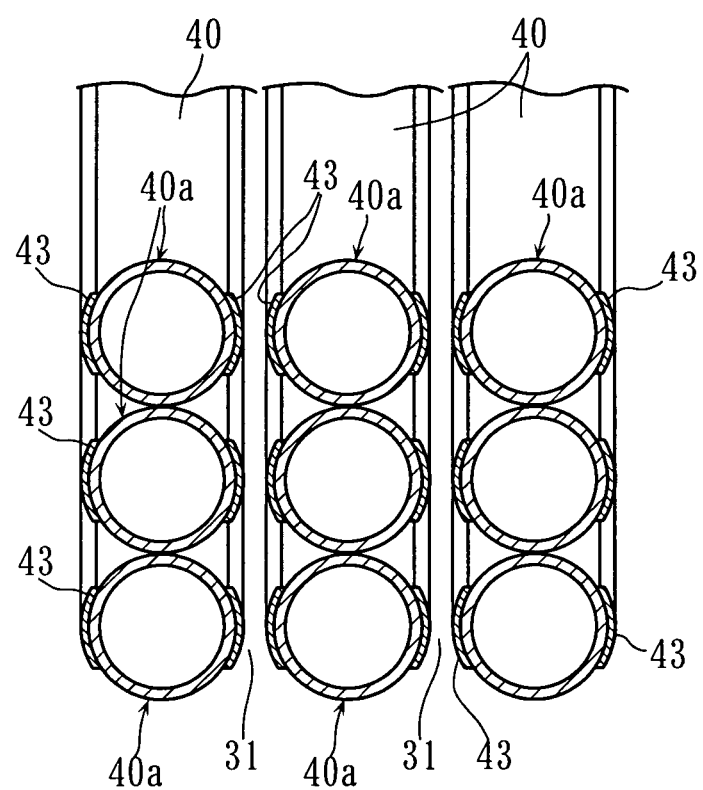
FIG. 5 is a sectional view of a principal portion of the coiled tube of the water heater shown in FIG. 1.

As shown in FIG. 5, the loops 40a with the clearance 31 are arranged in the horizontal direction. Preferably, each loop 40a partially includes a water-repellent portion 43 with water repellent function. The water-repellent portion 43 is treated with a fluoroplastic coating layer and has more water-repellent than other surfaces of the coiled tube 40. The water-repellent portions 43 are partially provided only at locations corresponding to clearances 31 on the outer surfaces of the loops 40a. The water-repellent portion 43 may be provided on the entire outer surface of the loop portion 40a.

As shown in FIG. 1, combustion gas passing through the opening 22B of the heat exchanger B1 flows outside through the exhaust ducts 81, 82. The exhaust duct 81 is mounted on an end of the housing 2, and combustion gas passing through the opening 22B is allowed to flow upwards and flows into the exhaust duct 82. The exhaust duct 82 is connected to the exhaust duct 81, and the exhaust duct 82 extends substantially in a horizontal direction above the heat exchanger B1. Combustion gas flows into the exhaust duct 82 flows outside from an exhaust opening 82a. The exhaust duct 82 is provided with an acoustical material 82a therein. The acoustical material 82a functions as a silencer to suppress the exhausting noise of the combustion gas. The acoustical material 82a, for example, is glass wool.

A discharging opening 26 for condensate is formed in the circumferential wall 20 in the housing 2 at a lower position of the second heat-exchanging portion HT2. When acidic condensate generated on the surfaces of the water tubes 4 drops on an inner surface of the circumferential wall 20, the condensate is discharged outside through the discharging opening 26 on the housing 2.

The neutralization apparatus 7 has a function to neutralize the condensate, and is a synthetic resin container 70 with acid resistance. The container 70 includes neutralizing agent 71 and an oil sensor 72 in itself.

The neutralizing agent 71, for example, is granular calcium carbonate. Condensate, which is discharged through the discharging opening 26, flows into the container 70 through the introducing port 70a. The condensate is discharged outside from the container 70 through the discharging opening 70b after being neutralized by neutralizing agent 71 in the container 70.

The container 70 is rectangular parallelepiped in shape and is allocated directly below both a region of the fuel supply controller 12 and the heat exchanger B1. According to this structure, even if an accident occurs; for example, combustion oil flows out from the fuel supply controller 12, the combustion oil drops on the container 70 and is appropriately received by the container 70.

As shown in FIG. 6, a rising wall 70c is formed at its peripheral edge of the container 70 so that combustion oil dropped on the container 70 does not overflow outside. The oil sensor 72 detects combustion oil. When combustion oil drops on the container 70, the oil sensor 72 immediately detects this situation. When this situation is detected, the controller 9 performs predetermined control. In this control, the controller immediately stops combustion process of the burner 1, and informs an alarm of this situation. The oil sensor 72 also has a function to detect combustion oil mixed in condensate flowed in the container 70. There is a case such as a small amount of unburned combustion oil is mixed into condensate due to ignition failure of the burner 1. For this case, an oil filter 73 to capture such a small amount of combustion oil is provided in the container 70. When a small amount of combustion oil is mixed in the condensate, the oil sensor 72 does not detect the combustion oil.

The controller 9 includes a microcomputer for example, controls each part of the water heater A1, and executes data processing. This controller 9 includes a data table 90 to store fan-controlling data for controlling the fan 13. The fan-controlling data is data, for example, as shown in FIGS. 7A to 7c and this fan-controlling data will be described thereafter.

Figure 7A:
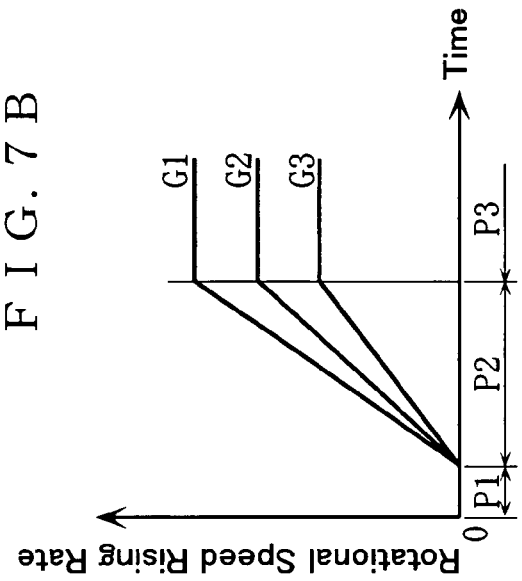
FIGS. 7A to 7C are explanatory chart showing an example of fan-controlling data stored in a controller of the water heater shown in FIG. 1.

The fan-controlling data shown in FIG. 7A is data to represent rotational speed of the fan 13 respectively corresponding to the predetermined three combustion levels G1 to G3 for burning when temperature of water entering the heat exchanger B1 is in the range of predetermined temperature (e.g., 20° C. or higher). The vertical axis in FIG. 7A shows a rotational speed rising rate of the fan 13. The rotational speed rising rate is a rising rate compared to a predetermined initial rotational speed N1. The combustion levels G1 to G3 has the relation of G1>G2>G3. First to third periods (P1 to P3) are memorized in the fan-controlling data when the burner activates. The first period P1 is a period till generating condensate after starting to drive the burner. Namely, the first period P1 means a period during which condensate is not being substantially generated. The second period P2 is a period as a transition period during increasing condensate on the surface of the water tube 4. The third period P3 is a period during keeping stable condensate generation. Air pressure by the fan 13 blows the condensate off on the surface of the water tube 4 when the amount of condensate exceeds the predetermined value. This amount of condensate blown off and the amount of new condensate generating are balanced, and the amount of condensate is stable. During the first period P1 in the fan-controlling data, the rotational speed rising rate of the fan 13 is zero, and the rotational speed is the predetermined initial rotational speed N1, whichever the combustion levels of the burner 1 is G1, G2, or G3. During the second period P2, the rotational speed rising rate rises linearly, and the rotational speed of the fan 13 is increased. During the third period P3, the rise of the rotation rising rate stops and the rotational speed of the fan 13 is stable.

Described in detail thereafter, during the second period P2, the air-fuel ratio of combustion by the burner 1 is stable by increasing the rotational speed of the fan 13 although the combustion gas-flow path area in the heat exchanger B1 reduces corresponding to the increasing condensate. During the second period P2, the inclinations of the rotational speed rising rate are different corresponding to the combustion levels G1 to G3, because condensate generates easier on the surface of the water tubes 4 as the combustion levels by the burner 1 is higher.

Figure 7B:
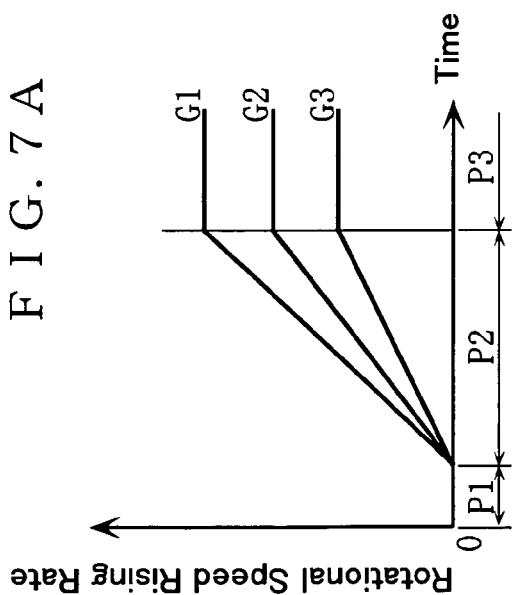
Figure 7C:
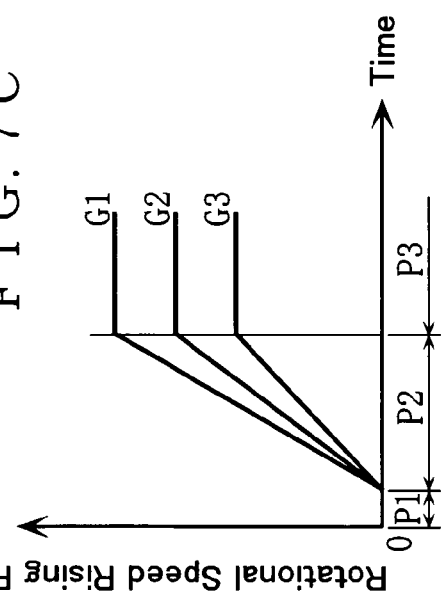

In a fan-controlling data shown in FIGS. 7B and 7C, the temperature of water entering the heat exchanger B1 is different from that of the previous case. The data shown in FIG. 7B is used when the temperature of entering water is in the range of 10° C. to 20° C. The data shown in FIG. 7C is used when the temperature of entering water is lower than 10° C. These data are basically the same as the data shown in FIG. 7A. If these data are with respect to the data shown in FIG. 7A, the inclination of the rotational speed rising rate during the second period P2 and the width of the first and second periods P1 and P2 are different. This is the reason why condensate generates easier on the surface of the water tubes 4 as the temperature of entering water is lower.

The fan-controlling data shown in FIG. 7A to FIG. 7C can be obtained by actually using the water heater A1 or a water heater having the similar structure under various conditions.

The fan-controlling data in this embodiment have three stages corresponding to the temperature of the entering water and the combustion levels by the burner 1. However, the present invention is not limited to this example. Four or more stages instead of three stages in this embodiment may be provided corresponding to the temperature of entering water and the combustion levels. On the contrary, these stages may be simplified.

The controller 9 controls the rotational speed of the fan 13 based on the fan-controlling data. In addition, the controller 9 estimates the amount of condensate remaining in the heat exchanger B1 when the burner 1 starts driving. The controller 9 controls by changing the appropriate initial rotational speed of the fan 13 based on the estimation. These descriptions will be explained thereafter.

Next, the operation of the water heater A1 will be described.

First, when the burner 1 is driven, combustion gas is supplied into the first region 30a. Then, the combustion gas is reflected by the partition member 6, the combustion gas passes through the clearance 31 of the first heat-exchanging portion HT1 and flows out into the combustion gas passage 32. In this process, heat is recovered from the combustion gas. Next, the combustion gas flows into the second region 30b from the combustion gas passage 32 through the clearance 31 of the second heat-exchanging portion HT2. In this process, heat also is recovered from the combustion gas.

The amount of recovered heat is much when combustion gas passes thorough the clearances 31. Because the first heat-exchanging portion HT1 and the second heat-exchanging portion HT2 comprise a plurality of wound-piled coiled tubes 40. In the water heater A1, for example, sensible heat can be recovered from the combustion gas in the first heat-exchanging portion HT1, and the latent heat can be recovered in the second heat-exchanging portion HT2. When the latent heat is recovered in the second heat-exchanging portion HT2, much condensate is generated in this portion HT2. In the case, much heat is recovered because the amount of recovered heat also is high in the first heat-exchanging-portion HT1, and condensate may be generated in this portion HT1.

Figure 8:
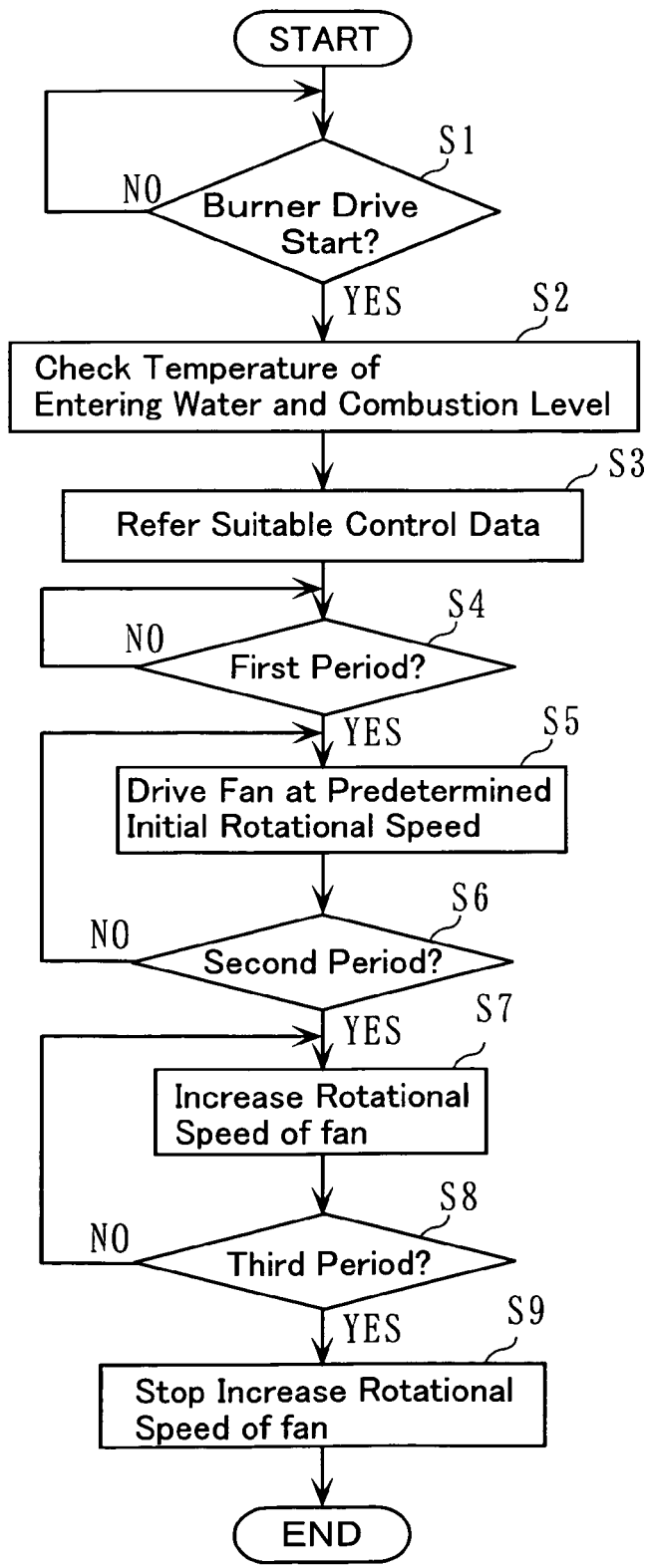
FIG. 8 is a flowchart showing an example of operation processing procedure of the controller of the water heater shown in FIG. 1.

Next, the operation of the water heater A1 will be described with reference to FIG. 8.

First, the controller 9 checks the temperature of entering water and levels of combustion when the burner 1 starts to drive. Next, control operation of the controller 9 will be explained with reference to the flowchart in FIG. 8.

First, when the combustion operation of the burner 1 is started, the controller 9 checks the temperature of entering water and the combustion level (S1: YES, S2). A temperature sensor (not shown) disposed near the water inlet of the water tube 4 detects temperature of entering water. The combustion level is determined by the controller 9 based on data of the temperature of entering water and outflowing water.

Next, the controller 9 selects data suitable for the actual temperature of entering water and the combustion level from a plurality of kinds of fan-controlling data, which are stored in the data table 90, and, after that, the controller 9 controls the fan based on the data (S3). Therefore, in this fan control, the fan 13 rotates at predetermined initial rotational speed during the first period P1 immediately after the burner 1 is started (S4: YES, S5).

Next, during the second period P2, the rotational speed of the fan 13 increases, and the increase of the rotational speed of the fan 13 stops and stabilizes in the third period P3 (S6: YES, S7, S8; YES, S9). Because the values of the first to third periods (P1 to P3) are predetermined as described above, the rotational speed of the fan 13 is changed corresponding to elapsed time from start of driving of the burner 1, and after that the rotational speed of the fan 13 is independent on the actual condensate generating state. However, the fan-controlling data is considered including the temperature of entering water and the combustion level, and the fan-controlling data are decided corresponding to the actual conditions by carrying out tests for example. Therefore, the controller 9 appropriately controls the fan corresponding to the actual condensate generation. During the second period P2, the combustion gas-flow path area in the heat exchanger B1 is reduced because the amount of condensate is increased. Because the rotational speed of the fan 13 increases, the amount of airflow through the heat exchanger B1 is stable. As a result, the air-fuel ratio in combustion by the burner 1 is also stabilized, and the burner 1 makes fuel burn at appropriate air-fuel ratio.

During the third period P3, the rotational speed of the fan 13 is stabilized. It is unnecessary to keep stabilizing the rotational speed after that. When the water heater A1 is actually operated, it can be assumed that the combustion gas-flow path area is reduced and the flow path is closed due to various conditions. Therefore, the structure or operation described as the conventional art in Japanese Patent Application Laid-open No. 2004-44912 may be employed. When it is determined that the flow path of the heat exchanger B1 is blocked, the airflow sent by the fan 13 may be increased.

When the water heater A1 is repeatedly used, the burner 1 is driven again in a state that condensate, which is generated in the last completed drive, attaches to the coiled tube 40. On the other hand, there is also a case that the burner 1 is driven again in a state of no condensate. There are various remaining states of condensate. The controller 9 corrects the initial rotational speed of the fan 13 corresponding to various case of condensate. This correction of the initial rotational speed will be described with reference to the flowchart in FIG. 9.

First, when the combustion operation of the burner 1 is started, the controller 9 estimates the state of condensate remaining on a surface of each coiled tube 40 at that time (S10: YES, S11). In this estimation of condensate, the controller 9 determines based on first data, second data, and third data; the first data means condensate remained after the last combustion operation, the second data means elapsed time, the third data means temperature for that period and after the last combustion operation. Specifically, the first data is data D1 of the rotational speed rising rate of the fan 13 when the last combustion operation of the burner 1 is completed. As described above with reference to FIGS. 7A to 7C, the amount of condensate remaining is determined on basis of the data D1 of the rotational speed rising rate of the fan 13 when the combustion operation is completed, because the rotational speed rising rate of the fan 13 corresponds to the amount of condensate.

The data 2 is determined as time data counted by the controller 9. This time data of data 2 means the period from the last completed combustion to this restart combustion. The data 3 is determined as temperature data of average temperature from the last completed combustion to this restart combustion. The housing temperature is detected by using a temperature sensor (not shown) mounted on the housing 20.

When the initial rotational speed rising rate of the fan 13 is defines as N1', the controller 9 calculates the initial rotational speed rising rate N1' from the following equation:

$$N1'=D1-(D2 \times D3).$$

The initial rotational speed (corrected rotational speed) of the fan 13 can be determined from the value of the original initial rotational speed N1 by calculating the initial rotational speed rising rate N1. The controller 9 starts driving the fan 13 based on the corrected rotational speed (S12) After that, the fan control as like described above is carried out.

When the amount of actual remaining condensate in the heat exchanger B1 is considered, the amount of remaining condensate at the restart combustion is more as the amount of remaining condensate at the last completed combustion is more. As longer time elapsed from the last completed combustion, the condensate is evaporated and the amount of remaining condensate is reduced. The same phenomenon occurs also when the temperature of the housing 20 is high. As the amount of remaining condensate at this restart combustion is more, the value of N1' becomes higher. Therefore, according to the controlling by the controller 9, when the amount of remaining condensate is more and the combustion gas-flow path area in the heat exchanger B1 is reduced, the initial rotational speed of the fan 13 is high so that the airflow amount is not running short.

Figure 9:
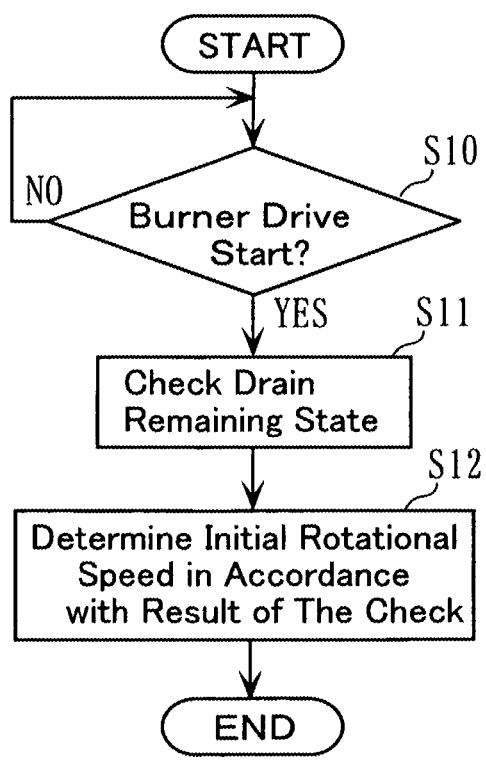
FIG. 9 is a flowchart showing another example of operation processing procedure of the controller of the water heater shown in FIG. 1.

Although it is not described in the flowchart in FIG. 9, when a predetermined time (e.g., three days) is elapsed after the last completed combustion, it is determined that the surface of the coiled tube 40 is dried and the amount of remaining condensate is zero. When the controller 9 drives the burner 1 again under such conditions, the initial rotational speed of the fan 13 is the original predetermined initial rotational speed N1 without taking into consideration of the amount of condensate remaining at the last completed combustion and the data of the housing temperature. According to this control, it is unnecessary to carry out the above-described calculation whenever the burner 1 is driven.

Figure 10:
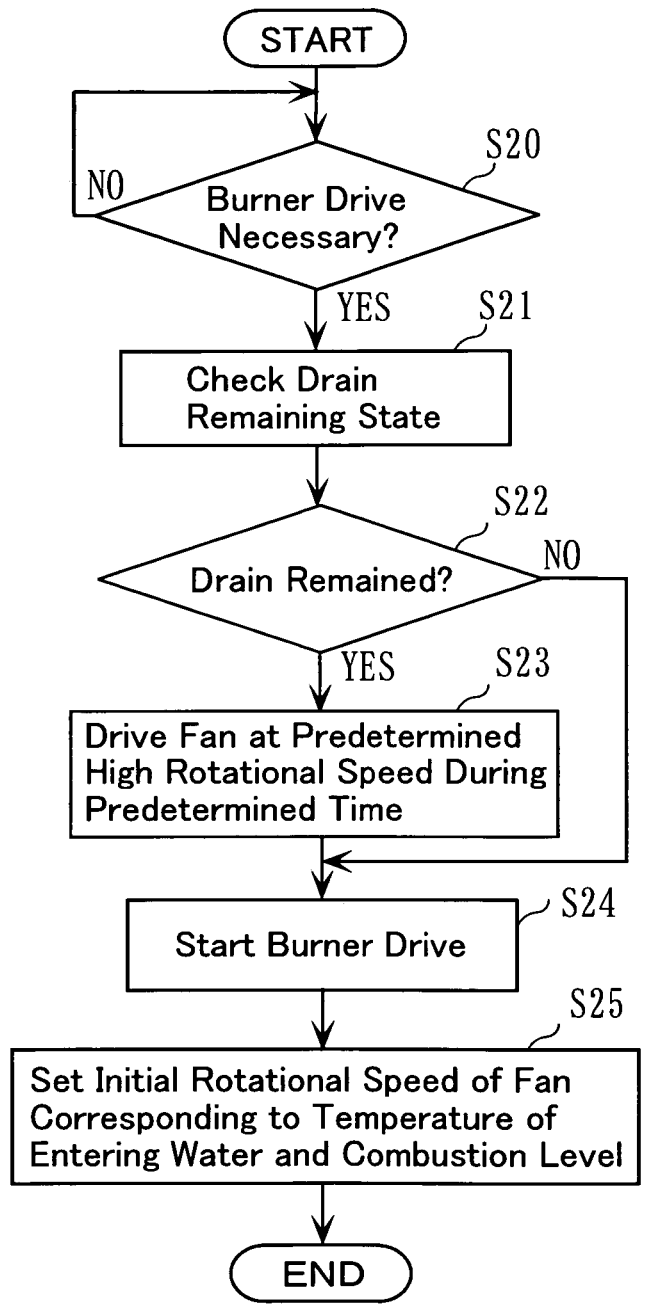
FIG. 10 is a flowchart showing another example of operation processing procedure of the controller of the water heater shown in FIG. 1.
Figure 11:
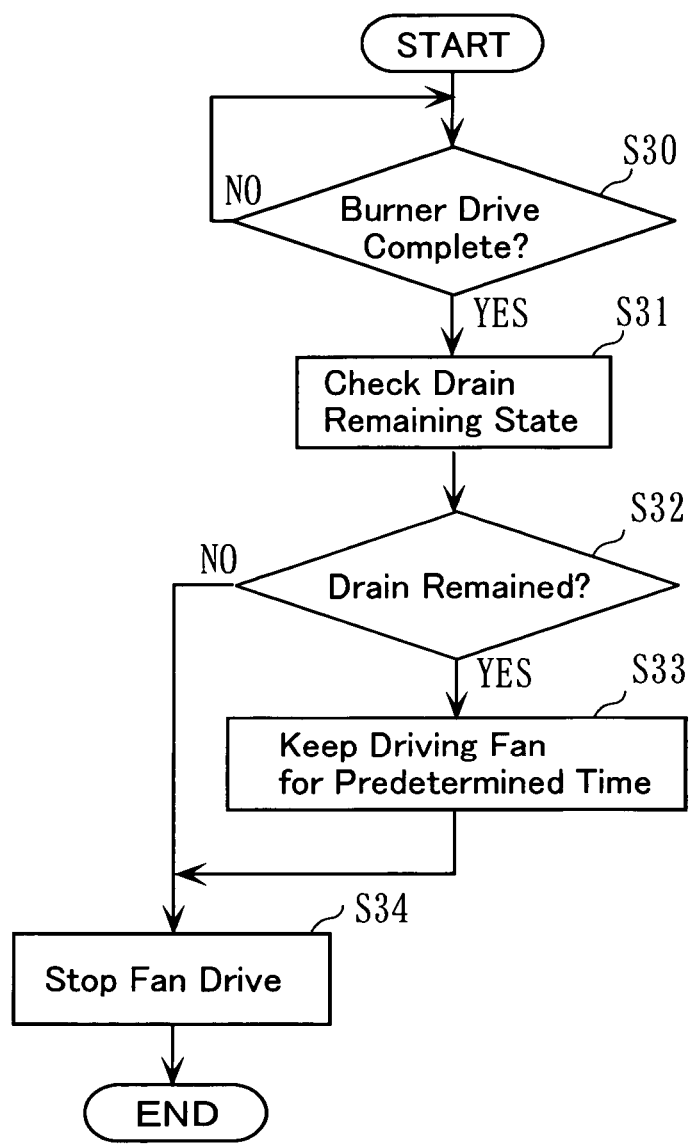
FIG. 11 is a flowchart showing another example of operation processing procedure of the controller of the water heater shown in FIG. 1.

FIGS. 10 and 11 show another example of the operation by the controller 9. In this invention, the operations shown in FIGS. 10 and 11 may be carried out. These other example will be explained thereafter.

In the operation shown in FIG. 10, the controller 9 determines the condensate remaining state on the surface of each coiled tube 40 at that time when the burner 1 needs to drive (S20: YES, S21). Then, when the controller 9 determines that the amount of remaining condensate is zero, the controller 9 immediately drives the burner 1, and drives the fan 13 at the predetermined initial rotational speed (S22: N0, S24, S25).

On the contrary, when the controller 9 determines that condensate remains, the controller 9 delays the burning-start during the predetermined period, and the fan 13 is rotated at predetermined high rotational speed during this delaying period (S22: YES, S23). Preferably, the rotational speed of the fan 13 at that time is possibly the highest rotational speed for the fan 13. This high-speed rotation blows condensate off the surface of each coiled tube 40. After the driving of the fan 13, the burner 1 starts burning (S24). Then, the rotational speed of the fan 13 is the predetermined initial rotational speed corresponding to the temperature of entering water and the combustion level (S25).

According to the above-described control, the driving of the burner 1 starts in a state that condensate does not remain on the surface of each coiled tube 40. Therefore, it is possible to precisely control the fan 13 after the burner 1 starts.

In the operation control as shown in FIG. 11, when the driving of the burner 1 finished, the controller 9 estimates the condensate remaining on the surface of each coiled tube 40 at that time (S30: YES, S31). If the controller 9 decides that no condensate remains, the controller 9 stops the driving of the fan 13 immediately (S32: N0, S34). On the other hand, if the controller 9 decides that condensate remains, the controller 9 makes the fan 13 rotate for a predetermined time and then the fan 13 stop (S32: YES, S33, S34). The condensate remaining on the surface of each coiled tube 40 is blown off by this control. Preferably, the rotational speed of the fan 13 is the highest rotational speed.

According to such this control, it is possible to not to allow condensate to remain on the surface of the coiled tube 40 after the burner 1 completed combustion. Therefore, it is possible to appropriately avoid a case that condensate badly affects the heat exchanger B1. After that, the burner 1 and the fan 13 can be driven in a state of no condensate.

In the water heater A1 of this embodiment, the elimination of condensate on the surface of the coiled tube 40 is enhanced as the detail description will be described thereafter.

That is, the heat exchanger B1 falls down sideway, and loops 40a, which are adjacent to each other through the clearance 31, is opposed to each other in the horizontal direction. According to such a structure, when condensate is generated in the clearance 31, there is an effect that the condensate is discharged out downward of the clearance 31 due to gravity. When condensate is bridged the clearance 31 between two loops 40a, the gravity also functions as a force which dissolves the bridge. The water-repellent portion 43 is provided on a location corresponding to the clearance 31 of the loop 40a and thus, the contact angle of the condensate is increased in this portion. Therefore, the condensate is less prone to bridge between the two loops 40a due to the surface tension. Even if the condensate bridges, there is an effect that the bridge is dissolved. For this reason, it is easy to eliminate the condensate on the outer surface of the coiled tube 40. If the surface of the coiled tube 40 is covered with condensate, the combustion gas does not directly affect the surface, and the amount of recovered heat is reduced. In the embodiment, such a problem is avoided. If much condensate exists in the clearance 31, the combustion gas-flow path area in the heat exchanger B1 is reduced and the air-fuel ratio is largely changed. This phenomenon is also reduced in the embodiment.

When a hydrophilic portion also is provided instead of the water-repellent portion 43, there is an effect that the condensate is less prone to bridge. The hydrophilic portion comprises a coating film of silicon dioxide. Because the swelling size of condensate is small on the surface of the hydrophilic portion, condensate is less prone to bridge between the adjacent loops 40a. Instead of providing the hydrophilic portion with the coating film, the hydrophilic portion also may be formed by subjecting the surface of the coiled tube 40 to blast processing or etching processing to make the surface coarse. By making the surface coarse, the amount of heat transfer by coiled tube 40 increases because the surface of the coiled tube 40 is not covered with the coating film. In this embodiment, the surface of the coiled tube 40 is partially provided with the water-repellent portion 43. This structure decreases the heat transfer by the coiled tube 40. Because much condensate is generated in the second heat-exchanging portion HT2, sufficient effect also can be obtained when the water-repellent portion 43 or the hydrophilic portion is provided on only the second heat-exchanging portion HT2.

FIGS. 12 to 16 show other embodiments of the present invention. In these drawings, the same or similar elements in the previous embodiment are used the same symbols.

Figure 12:
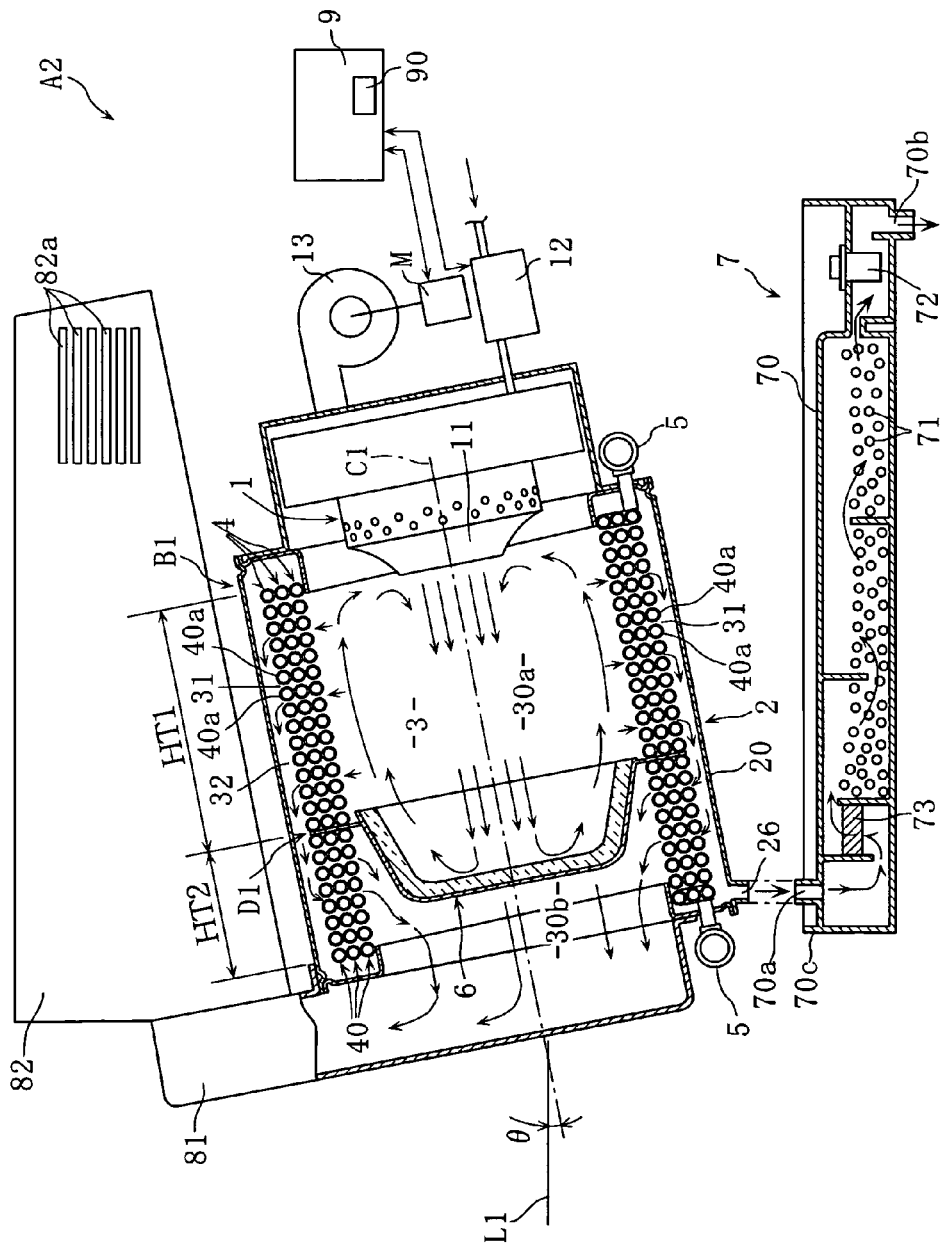
FIG. 12 is a schematic sectional view of an essential portion showing another example of the water heater according to the present invention.

In a water heater A2 shown in FIG. 12, the housing 2 of the heat exchanger B1 and the center axes C1 of a plurality of coiled tubes 40 are inclined at an appropriate angle θ with respect to the horizontal line L1. The angle θ is about 5 to 15°. The angle θ is not limited to this range, and can be greater than this range. Preferably the angle θ is 45° or smaller.

In the water heater A2, loops 40a, which are adjacent to each other in the axial direction of the center axis C1, are opposed to each other in the slant direction through the clearance 31. According to this structure, there also is an effect that condensate existing in the clearance 31 can be discharged from the clearance 31 by using gravity. There is also an effect that condensate dropped on the circumferential wall 20 of the housing 2 from the coiled tubes 40 is smoothly guided by the discharging opening 26 along the inclination of the circumferential wall 20.

Figure 13B:
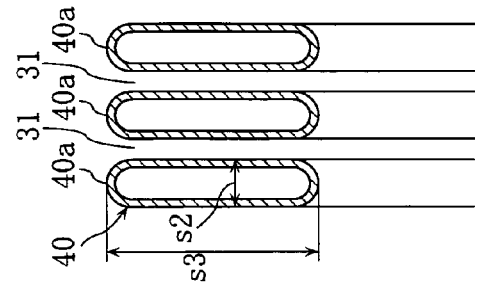
FIG. 13B is a sectional view of a principal portion of FIG. 13A.
Figure 13A:
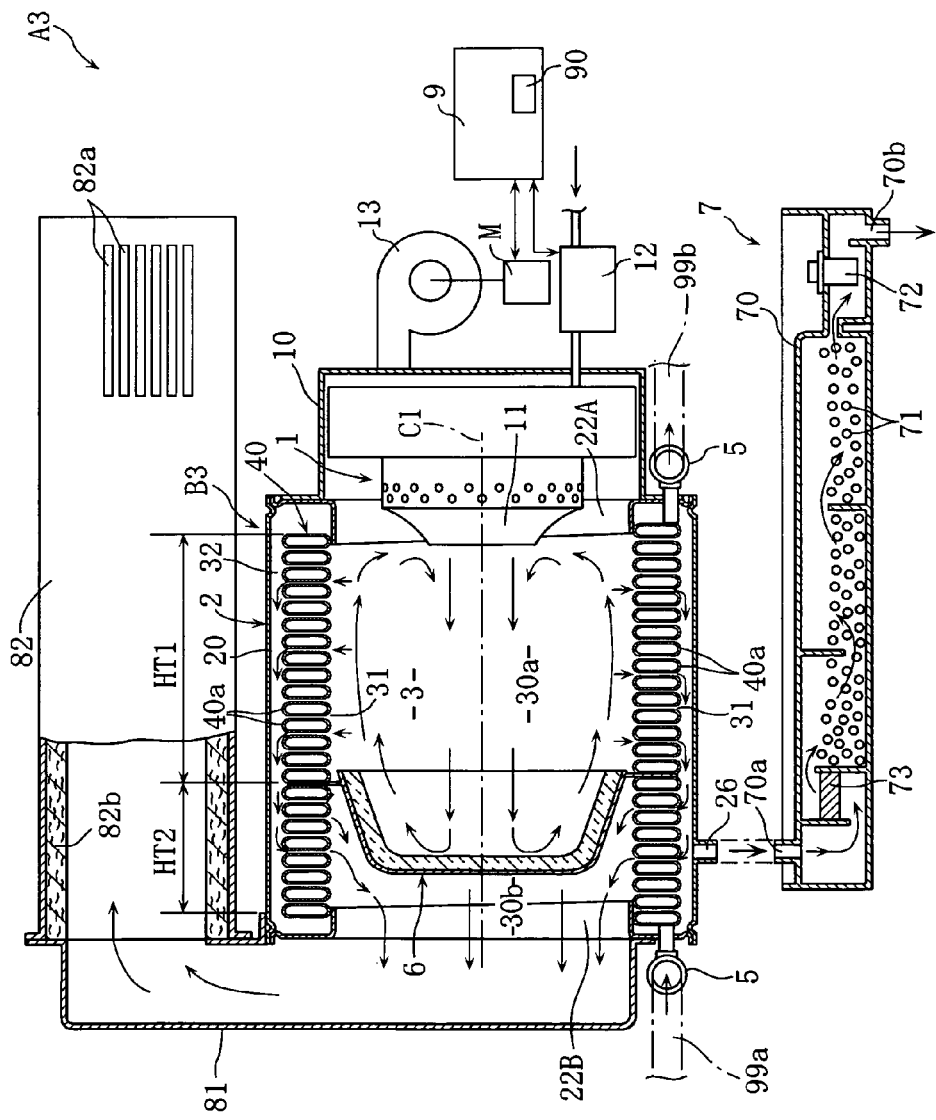
FIG. 13A is a schematic sectional view of a principal portion showing another example of the water heater according to the present invention.

In a water heater A3 shown in FIG. 13A, flat tubes are used as coiled tubes 40 of a heat exchanger B3. As shown in FIG. 13B, in the flat tube, a width s3 thereof in a direction intersecting with the center axis C1 of the housing 2 is greater than a width s2 thereof in the same direction of the center axis burner 1. According to this structure, the amount of heat transfer when the combustion gas passes through the clearance 31 increases without employing the structure in which the coiled tubes 40 are wound in the overlapping manner because the clearance length of the loops 40a increases.

Figure 14:
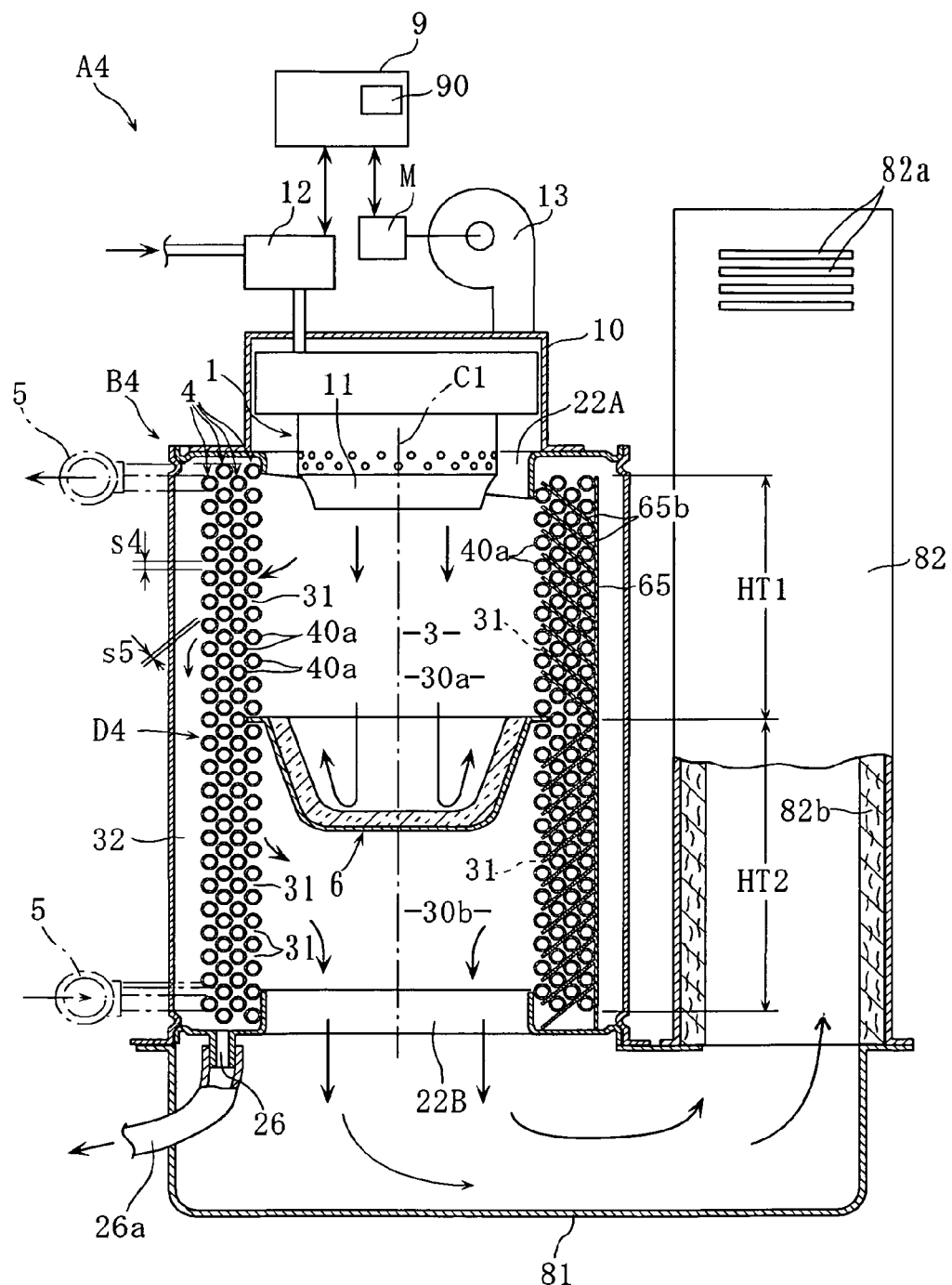
FIG. 14 is a schematic sectional view of a principal portion showing another example of the water heater according to the present invention.
Figure 16:
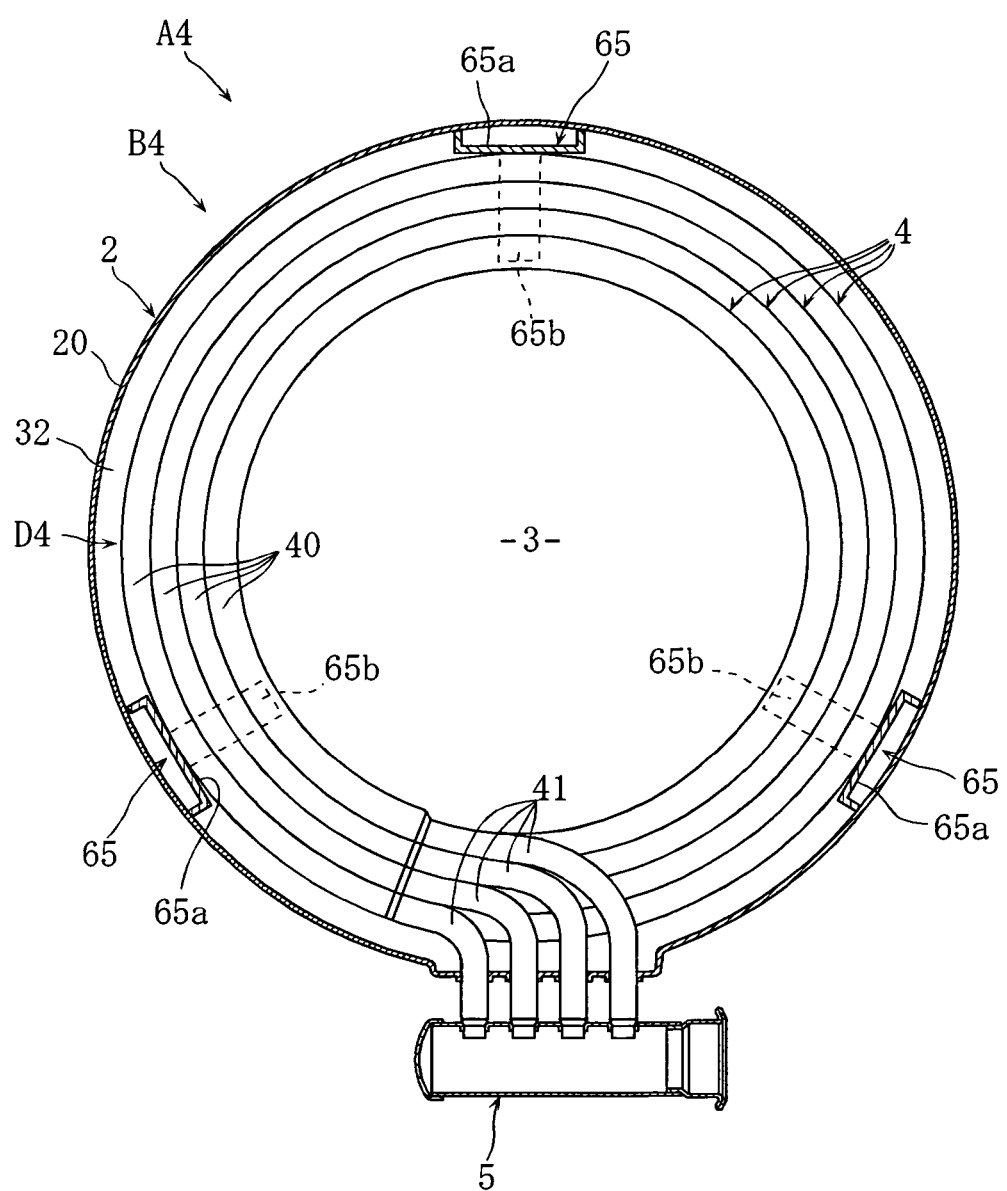
FIG. 16 is a sectional view taken along lines XVI-XVI in FIG. 15.

In a water heater A4 shown in FIG. 14 to 16, the heat exchanger B4 stands substantially vertically and the burner 1 is provided above the heat exchanger B4. The burner 1 injects combustion oil downwardly and burns the combustion oil, and the fan 13 sends air downwardly in the casing 10 of the burner 1. The exhaust duct 81 is connected to a lower portion of the heat exchanger B4 and is located below the heat exchanger B4. A lower end of the exhaust duct 82 is connected to the exhaust duct 81, and stands on one side of the heat exchanger B4.

The heat exchanger B4 includes four water tubes 4 for example, and the coiled tubes 40 of the water tubes 4 are substantially concentrically overlapped and wound to constitute a tube overlapping-winding structure D4. The tube overlapping-winding structure D4 is the same as the water heater A1 in that the tube overlapping-winding structure D4 is divided into the first heat-exchanging portion HT1 and the second heat-exchanging portion HT2. However, the loops 40a of the coiled tubes 40, which are adjacent to each other in a direction intersecting with the axial direction, are arranged straightly, and the loops 40a of the coiled tubes 40 is inclined with respect to the axial direction. According to this structure, the clearances 31 formed between the arrangements incline.

The clearance 31 is inclined such that the height of the clearance 31 becomes lower as approaching in the advancing direction of the combustion gas. More specifically, the clearance 31 of the first heat-exchanging portion HT1 becomes lower as approaching the outer periphery of the tube overlapping-winding structure D4, and the clearance 31 of the second heat-exchanging portion HT2 becomes lower as approaching the inner periphery of the tube overlapping-winding structure D4. This structure is realized using a spacer 65. As shown with phantom lines in FIG. 15, the spacer 65 comprises a thin base plate 65a extending in the vertical direction, and a plurality of projecting pieces 65b diagonally projecting from one surface of the base plate 65a in the vertical direction. The spacer 65 is assembled in the tube overlapping-winding structure D4 such that four loops 40a are inserted between the adjacent projecting pieces 65b side-by-side. As shown in FIG. 16, three spacers 65 are disposed at three locations of the tube overlapping-winding structure D4 at equal distances from one another. If a back surface of the spacer 65 is brought into abutment against the circumferential wall 20 of the housing 2, the spacer 65 can be positioned appropriately.

As shown in FIG. 15 clearly, a minimum width s4 of the clearance 31 in the vertical direction is greater than a minimum width s5 of the clearance 31 in a direction intersecting with the extending direction of the clearance 31 at right angles. Preferably, the minimum width s4 is 3 mm or greater. The innermost-coiled tube of the coiled tubes 40 has a coil diameter greater than those of the other coiled tubes 40. The innermost-coiled tube receives more heat from the burner 1 in comparison with the other coiled tubes 40. Because the innermost-coiled tube 40 has the greatest diameter, this is advantageous for increasing the amount of heat recovering. This structure also has an effect that hot water therein is prevented from boiling. In the water heater A4, condensate generated on the coiled tube 40 flows and drops on the cover body 21B of the bottom of the housing 2. In the cover body 21B, a condensate discharging opening 26 is provided, and the condensate flows to the neutralization apparatus (not shown) from the discharging opening 26 through a tube 26a.

In the water heater A4 of the embodiment, because each clearance 31 of the tube overlapping-winding structure D4 extends in the inclining manner as advancing in the flowing direction of the combustion gas, the discharging effect of condensate from the clearance 31 is more effective. As a result, it is possible to prevent much condensate from being held by the clearances 31 so that a wide range of the surface of the coiled tube 40 is not covered with the condensate. Because the minimum width s4 of each clearance 31 in the vertical direction is wide, there is an effect that the condensate does not easily bridge between the loops 40a, which are adjacent to each other in the vertical direction. Especially when the minimum width s4 is 3 mm or greater, and the condensate does not bridge based on the surface tension. Therefore, it is possible to more reliably prevent the condensate from being held in the clearance 31. On the other hand, because the minimum width s5 in the direction intersecting with the extending direction of the clearance 31 is small, the amount of heat transfer increases when the combustion gas passes through the clearance 31.

In this water heater A4, like the water heater A1, the tube overlapping-winding structure D4 is divided into the first heat-exchanging portion HT1 and the second heat-exchanging portion HT2, and combustion gas passes through the first heat-exchanging portion HT1 and the second heat-exchanging portion HT2 and heat is recovered. Therefore, as described the above water heater, the heat-exchanging efficiency is enhanced. Because condensate is generated mainly in the second heat-exchanging portion HT2, the discharging efficiency of condensate is sufficiently enhanced even when only the second heat-exchanging portion HT2 is provided with the structure having the inclined clearance 31. However, because condensate also may be generated in the first heat-exchanging portion HT1 depending upon the operation conditions of the water heater A4, it is possible to cope with such a conditions by the structure, that is, the first heat-exchanging portion HT1 is formed with the inclined clearance 31.

The present invention is not limited to the contents of the above-described embodiments. The concrete structures of various portions of the water heater of the invention may variously be changed in design.

For example, in the invention, the burner may be disposed below the heat exchanger so that combustion gas flows upwardly.

A straight pipe having a fin may be used as the water tube of the heat exchanger instead of the water tube having the coiled tube.

Gas burner may be used as the burner instead of the oil burner, which burns kerosene or light oil. The partition member is not limited in this structure. The partition member only needs to have a function for dividing the space into the first and second regions, and the partition member may be formed into a simple flat plate in shape. Additional partition member may be used to further divide the second region into a plurality of regions so that the combustion gas flows through a plurality of regions. A rectangular parallelepiped housing of the heat exchanger may be used instead of the cylindrical housing. A hollow rectangular loop of the coiled tube may be used instead of the hollow circular loop.

The water heater of this invention means an apparatus having a function for producing hot water. The water heater includes various water heaters for supplying hot water, for supplying hot water to bath, for home heating, and for melting snow, and an apparatus used other purpose except supplying hot water.

What is claimed is:

1. A water heater comprising:
a burner;
a fan for supplying air for combustion;
a heat exchanger including a housing into which combustion gas is supplied together with air, and a water tube recoverable of sensible heat and latent heat from the combustion gas, and at least a portion of the water tube disposed in the housing; and
a controller including a data table and controlling the fan based on the data stored in the data table
wherein:
plural kinds of fan-controlling data are stored in the data table;
the plural kinds of the fan-controlling data include a first period during which condensate is not substantially generated on a surface of the water tube, a second period during which condensate gradually increases on the surface of the water tube and a third period during which generated condensate is stabilized, the first period and the second period being periods during which the combustion gas generated by the burner is supplied from the burner into the heat exchanger;
the rotational speed of the fan is at a constant predetermined first rotational speed during the first period, rotational speed of the fan is at a constant predetermined second rotation speed during the third period, the constant predetermined first rotational speed being slower than the constant predetermined second rotational speed and the rotational speed of the fan is continuously increased with time from the constant predetermined first rotational speed to the constant predetermined second rotational speed during the second period;
the plural kinds of fan-controlling data are defined corresponding to at least one of a combustion level by the burner and temperature of water entering the heat exchanger; and
each one of the fan-controlling data includes data for stopping the increase of the rotational speed of the fan when the third period starts after completion of the second period, the third period being a period during which the combustion gas generated by the burner is supplied from the burner into the heat exchanger.

2. The water heater according to claim 1, wherein:
the controller determines remained condensate on restarting the burner based on first data, second data, and third data;
the first data concern the amount of remained condensate when the last combustion by the burner is completed;
the second data concern the elapsed time until restarting combustion after completing the last combustion;
the third data concern temperature of the housing during the elapsed time; and
the initial rotational speed is changed in accordance with a result of the determination such that the initial rotational speed when the generated condensate amount is determined high is more increased than that when the generated condensate amount is determined low.

3. The water heater according to claim 2, wherein under the condition that time elapsed until restart of combustion after completion of the last combustion exceeds a predetermined period on restarting the burner, the controller applies a predetermined rotational speed as the initial speed of the fan despite of the contents of the first and the third data.

4. The water heater according to claim 1, wherein:
the controller determines remained condensate on restarting the burner based on first data, second data, and third data:
the first data concern the amount of remained condensate when the last combustion by the burner is completed; the second date concern the elapsed time until restarting combustion after completing the last combustion; the third data concern temperature of the housing during the elapsed time; and
under the condition that the controller decides that the amount of remained condensate is equal to or more than a predetermined value, the controller delays the burner's start time for a predetermined time and rotates the fan at predetermined speed to reduce the remained condensate during this delay time.

5. The water heater according to claim 1, wherein:
the controller determines the amount of remained condensate on completing combustion by the burner; and
under the condition that the controller decides that the amount of remained condensate is equal to or more than a predetermined value, the controller continuously rotates the fan to reduce the remained condensate thereafter.

6. The water heater according to claim 1, wherein:
the housing of the heat exchanger includes a circumferential wall with a first opening and a second opening at axially opposite ends;
the water tube includes a coiled tube having a plurality of loops along the axial direction via clearances, and a combustion gas path is formed around the coiled tube and inside the circumferential wall for guiding combustion gas in the housing;
a partition is provided in an inner space in the coiled tube and the partition divides the space in the axial direction into a first and a second heat-exchanging portions surrounding a first and a second region, respectively; and
combustion gas supplied to the first region flows to the combustion gas path through clearances of the first heat-exchanging portion and then flows through clearances of the second heat-exchanging portion.

7. The water heater according to claim 6, wherein the heat exchanger falls down sideways in such a manner that the axial length is substantially horizontal, and the plurality of loops are arranged substantially in the horizontal direction via clearances along the axial direction of the loops.

8. The water heater according to claim 6, the heat exchanger is inclined on the slant, and a plurality of loops is arranged on the slant direction with respect to the horizontal direction via clearance along the axial direction of the coiled loops.

9. The water heater according to claim 6, wherein at least one additional coiled tube is provided and this additional coil includes a plurality of loops arranged in housing along the axial direction via a clearance, and the additional coil surrounds outsides said coiled tube in a tube overlapping-winding structure;
the tube overlapping-winding structure is divided into a first heat-exchanging portion for recovering sensible heat surrounding the first and second region and a second heat-exchanging portion for recovering latent heat;
combustion gas supplied to the first region flow through the clearance of the first heat-exchanging portion and flows the combustion gas passage;
the combustion gas flow through the clearance of the second heat-exchanging portion;
the loops of at least the second heat-exchanging portion of the tube overlapping-winding structure which are adjacent to each other in a direction intersecting with the axial direction are arranged on a straight line inclined with respect to the axial direction; and
the clearance of the second heat-exchanging portion is inclined such that height of the clearance is reduced as moving in the advancing direction of the combustion gas.

10. The water heater according to claim 9, wherein a minimum width of the clearance of the second heat-exchanging portion in a direction intersecting with an extending direction of the clearance at right angles is smaller than a minimum width of the clearance of the second heat-exchanging portion in the axial direction.

11. The water heater according to claim 1, wherein water-repellent portions are partially provided on outer surfaces of loops of the second heat-exchanging portion.

12. The water heater according to claim 6, wherein a hydrophilic portion is partially provided where outer surfaces of the loops of the second heat-exchanging portion are faced interposing the clearance.

* * * * *